United States Patent Office 3,293,205
Patented Dec. 20, 1966

3,293,205
POLYOXYMETHYLENE FIBERS FOR THICKENING ORGANIC RESINS
Carroll F. Doyle, Ellicott City, and Luther O. Young, Baltimore, Md., assignors to W. R. Grace & Co., New York, N.Y., a corporation of Connecticut
No Drawing. Filed July 12, 1963, Ser. No. 294,748
36 Claims. (Cl. 260—37)

The present application is a continuation-in-part of our earlier filed application Serial Number 182,026, filed March 23, 1962, now abandoned.

This invention relates to thickening agents. In one specific aspect, it relates to a thickening agent having insecticidal properties.

Normally solid polyoxymethylenes are a material known to the art. Usually these polymers are produced by catalytic polymerization of formaldehyde or of the cyclic formaldehyde trimer known as trioxane which has the formula

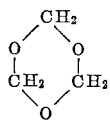

These known methods use catalysts such as inorganic fluorides, triethyl oxonium salts, dimethyl cadmium, diphenyl tin and the like. Polymerization to normally solid polymers by these catalytic methods is complete after reaction periods of up to 6 or 7 days.

Normally solid polyoxymethylenes made by known prior art methods have been used to form films, monofilaments, cast molded articles and the like.

It has recently been discovered by others that trioxane can be polymerized by irradiation of the trioxane in an inert atmosphere to form polyoxymethylenes having good thermal stability and a high degree of toughness. Briefly the process involves subjecting solid trioxane to a radiation dosage of from about 0.001 to about 10.0 megarads with ionizing radiations while maintaining the trioxane at a temperature between about 0° C. and just below its melting point, and subsequently holding or ageing the irradiated trioxane at a temperature of from about 25° centigrade up to about the thermal degradation temperature of the reactants for a sufficient period of time to polymerize the trioxane. Preferably the trioxane is subjected to radiation dosages between about 0.02 and 1.0 megarads while at a temperature below 20° centigrade; and then subsequent polymerization is carried out at or just below the melting point of the irradiated trioxane, i.e., at temperatures of from about 55° to about 64° centigrade. Irradiation produced polyoxymethylenes made by this method can be used in the same applications of previously known polyoxymethylenes.

A wide variety of materials have been used to increase the viscosity of paints, various emulsions, and numerous molding compositions to permit better applicability, smoother flow rates and the like. Such materials, which will be called "thickeners" herein, include fine-size silicas and sileceous compositions, e.g. clays; casein and soya proteins; methyl cellulose; sodium carboxymethyl cellulose; various alginates such as ammonium alginate; and various polyacrylates such as alkali metal and ammonium polyacrylates. There is currently a wide demand for other materials which will provide better thickening ability (i.e., which will give greater viscosity increase) when used in the same or smaller proportions than the known thickeners.

It is a principle object of this invention to provide a method for thickening plastisols, organosols, synthetic and natural resin latices, paints, liquid polyesters, liquid polyepoxides, and other like materials by incorporation therein of finely divided fibers of irradiation produced polyoxymethylenes. It is a further object of this invention to provide a method for killing insects with insecticidal dusts that have superior sticking qualities upon the insect, and which are "dustless" or non-annoying to those spreading or spraying them about. Other objects will be apparent to those skilled in the art in view of the more detailed description which follows.

The polyoxymethylene fibers used in this invention consists of finely divided fibers of irradiation produced polyoxymethylenes. These fibers have a major dimension not greater than about 50 microns and usually less than 10 microns. The smallest dimension of the product varies from less than 5 to less than 1 micron. Thus the length to diameter ratio of the ultimate particles is always greater than 10 to 1 and usually is much higher. The chemical properties of these fine-sized fibers are essentially the same as those of the parent polymer from which they are produced. The apparent density of the fibers, as best as can be determined is on the order of .01 grams per milliliter which value gives a good indication of the fluffiness and high bulk of the fibers as recovered. These fibers can however be readily compressed and matted together to produce an exceptionally strong product.

As noted above, the parent polyoxymethylene polymers, from which the finely divided fibers of this invention are produced, are made by irradiation of trioxane at relatively low temperatures. These polymers are normally solid and are characterized by a high degree of toughness, relatively good thermal stability which is greatly improved by stabilization in known manner, reduced specific viscosities of from about 0.05 up to about 4.0 and preferably from about 0.25 to about 1.5, and a melting point of about 150° centigrade or above. "Toughness" as used herein is determined by subjecting the film, 3 to 8 mils in thickness, to a series of manual creasing actions. A single crease cycle consists of folding the film through 180°, creasing, and then folding in the reverse direction through 360° and creasing. The number of creasing cycles the film withstands before breaking is known as the degree of toughness. Thus, a film that cannot stand one complete cycle has a degree of toughness of 0. If it breaks on the sixth cycle, for example, it has a degree of toughness of 5.

Thermal stability is defined by the value of the rate constant for thermal degradation at 222° centigrade. The degradation reaction is assumed to be a first order reaction which can be expressed mathematically by the differential equation:

$$-\frac{dw}{dt} = KW$$

where $t$ is time from the beginning of decomposition;
$W$ is the weight of the material remaining at time $t$;
$K$ is the rate constant for the equation.

If an unstabilized material had a thermal stability such that the value of K were greater than 2% per minute, the material would be considered too unstable to have any value as a polymer material. The value of this rate constant K for thermal degradation at 222° centigrade was determined using the syringe stability test. In this test, the number of ml. of gas evolved per gram of polymer for each five minutes of elapsed time at 222° centigrade is measured and the results converted to give a value of the rate constant K. The stability of the sample is determined by heating a sample of the polymer, weighed to the nearest milligram, to 222° centigrade in a hypodermic syringe and observing the position of the syringe cylinder at five minute intervals after the beginning of the test. A 50 ml. syringe is preferred for making the test. The syringe is cleaned and the polymer, in the form of a pressed pellet, is weighed and placed in the syringe. The syringe is lubricated between the piston and cylinder with a high quality inert oil or grease material. The syringe is evacuated and filled with nitrogen several times. Silicone oil is drawn into the syringe and ejected until about 5 ml. remains. The oil surrounding the polymer pellet serves as a means for expelling all gases before the test and as a heat transfer medium during the test. The nozzle of the syringe is then sealed and the syringe placed in a vapor bath at 222° centigrade. The vapor bath may be vapors of methyl salicylate. The position of the syringe cylinder is noted at five minute intervals after the syringe is first placed in the vapor bath. The test may be continued for periods of 30 minutes or more and the position of the syringe piston over each five minute period determined. The change in position over the heating period determines the amount of gas evolved in the test and thus the amount of polymer degraded to monomer.

The thermal degradation of the trioxane polymers generally follows that predicted for a first order reaction. The data collected in the syringe stability test is converted to give the rate constant for thermal degradation K (222) using the equation:

$$K(222) = \frac{\text{volume of gas evolved in ml. in time } T \times 0.0736}{\text{time T in minutes} \times \text{initial weight of the polymer sample in grams}}$$

The factor 0.0736 is a constant calculated on the assumption that the gas evolved is monomeric formaldehyde and that it follows the gas law as an ideal gas. A K (222) value of 1 in reciprocal minutes is equivalent to 1% degradation per minute. Reduced specific viscosities are determined using γ-butyrolactone containing 0.5% of 4,4'-thiobis (6-tert-butyl orthocresol) and 0.5% 2,6-di-tert-butyl-p-cresol as a solvent. In determining the reduced specific viscosity a weighed sample of the polymer was heated with a sufficient quantity of the γ-butyrolactone solvent to give a concentration of 0.1 g. per 100 ml. at 135° centigrade. The sample was heated to 155° centigrade to effect rapid solution of the polymer in the solvent. After the polymer had dissolved the liquid was added to a standard Stabin viscometer in a Hallikainen bath maintained at 135° centigrade.

The reduced specific viscosity was determined using the formula $$\frac{\eta_{sp}}{C} = \frac{\frac{t_2 - t_1}{t_1}}{C \text{ g./100 ml.}}$$

The unit of reduced specific viscosity is deciliter g.=1. The unit $t_2$ is defined as the running time of the solution and $t_1$ the running time of the pure solvent. The differences in reduced specific viscosity are apparent from the differences in flow time in the viscometer. The reduced specific viscosity is significant in that it is a measure of the molecular weight of the polymer. The exact relative molecular weights cannot be determined without knowing the value of the exponent α in the Mark-Houwink Equation $n = KM^\alpha$.

Although the crude irradiation produced polymers have good thermal stability, their stability may be improved by further treatment. In a typical method of improving the stability of these polymers, the crude product is dissolved in a suitable solvent such as dimethylformamide or ethylene carbonate, for example, and small amounts of stabilizing materials are added to the polymer solution. The polymer is then precipitated by suitable cooling methods such as pouring the solution into cold alcohol, recovered by, e.g., filtration, and washed and dried. The polymers may also be treated with stabilizing materials by milling the material into the polymer or depositing the stabilizers in solution onto the solid polymer, etc.

The preferred process for making finely divided fibers from the irradiation produced polyoxymethylene comprises providing a moving body of particulate polymer suspended in a gaseous medium at superatmospheric pressure and at temperatures between about 40° and 200° Fahrenheit, continuously introducing additional fluid within said temperature range in a plurality of high velocity streams directed inwardly into said body in a manner to cause extreme turbulence in the mass and resulting attrition and fracturing of the suspended particles, continuously removing the comminuted, fibrous polyoxymethylene from the body along with the gaseous medium, and separating the finely divided fibers from the suspending gas. Suitable apparatus for carrying out the process is known to the art. Such apparatus is commonly known as a fluid energy mill. In this apparatus relatively large particulate material is suspended in a gaseous medium whirling around in an enclosed space and additional gases are introduced into the whirling body in a manner causing turbulence within the body and comminution and fracturing of the particles by attrition. A complete description of such apparatus and its mode of operation can be found in Perry's Chemical Engineer's Handbook, Second Edition (1941), at pages 1930–32, which is incorporated herein in its entirety by reference thereto. Other methods can also be used to comminute the irradiation produced polyoxymethylene and to form finely divided fibers therefrom. Briefly one of the processes comprises slurrying or suspending particulate polyoxymethylene in an inert liquid, e.g., water, feeding the slurry or suspension between closely spaced grinding surfaces which rotate with respect to each other (e.g., through a colloid mill), and separating the comminuted fibrous product from the suspending liquid, and drying. Other methods of comminuting the irradiation-produced polyoxymethylene will be apparent to those skilled in the art after they are apprised of the methods described above.

In the preferred method of preparing the finely divided fibers of this invention, the parent irradiation-produced polyoxymethylene is preliminarily comminuted to sizes of about ⅛-inch or less. This is required only in order to permit feeding of the polymer to the comminution apparatus. Because of its inexpensiveness and ready availability, the preferred gaseous suspending medium is air, which may be pre-filled if desired. Air is also preferably used as the supplemental turbulence-creating gas. Suitable pressures of the suspension air range from about 100 to about 500 (preferably about 190 to about 225) pounds per square inch gauge, while the auxiliary turbulence creating air is injected into the whirling body of particulate polyoxymethylene at pressures which can range from about 100 to about 500 pounds per square inch gauge, and preferably are between about 180 and about 200 p.s.i.g. The preferred air temperature is from about 50° to about 100° Fahrenheit. Temperatures somewhat above or below this range can be used if desired but do not give any significant advantages. The finely divided fibers of polyoxymethylene can be separated from the suspending air in any suitable manner, preferably by use of a cyclone separator. It will be found that one pass through the fluid energy mill produces a mass of fibers at least 90% by weight of which have major dimensions less than about 50 microns and in most cases less than 10 microns. Electron micrographs of typical finely divided fibers made from irradiation-produced polyoxymethylene in accordance with this invention are shown in the attached drawing. The respective FIGURES 1 and 2 are self-explanatory.

The finely divided fibers are useful as heat and sound insulation, fillers, flocculators, insecticides, fungicides, parasiticides, rodenticides, nematocides, biocides, for making threads, yarns and other textile like materials, for solution coating, solution casting or flame spraying; as additives for various synthetic and natural rubbers, resin and rubber latices, etc., as paint additives, as fuel additives or for preparing jellied fuels analogous to napalm, as cement additives, as gas filters, for preparing mats and other like products, as anticaking agents, as a sticking agent in preparing insecticidal compositions and for innumerable other purposes.

A particularly efficacious use for these finely divided fibers is a viscosity increasing agent for curable liquid resins (such as polyesters and polyperoxides) and resin latices (such as paints). The finely divided fibers are more readily wetted and dispersed and give much greater increases in viscosity at generally lower concentrations when compared to known commercial thickening agents. In addition, it has been discovered that use of mixtures of the finely divided polyoxymethylene fibers with fine sized (about 2 to 10 microns average particle size) materials gives increases in thickening ability with polyepoxides that could not be expected from the characteristics of the individual materials. These mixtures when used as thickeners for other materials, e.g., polyesters have more stable thickening properties when compared to use of finely divided fibrous polyoxymethylene alone. These improvements can be seen when the fine sized materials used in amounts between about 5% and 95% by weight of the total blend of thickener agent.

The invention is illustrated, but not limited by, the following specific examples.

*Example 1.—Preparation of polyoxymethylene by irradiating trioxane*

A suitable portion of trioxane was placed in an ordinary household baking pan and formed into a plaque by placing the pan in an ordinary steam-heated laboratory size hydraulic press, and heating by means of the press to a temperature sufficient to melt the trioxane (about 120° centigrade). The plaques were then cooled to room temperature (about 21° centigrade) and subjected (at that temperature) to an irradiation dosage of between about 0.1 and 0.5 megarep. The radiation source in each instance was high energy radiation from a Van de Graff electron accelerator. Other sources can also be used.

The irradiated plaque was then broken up into small chunks, portions of which were placed in a series of capped bottles. The bottles were then placed in a constant temperature bath maintained at 55° centigrade and the irradiated bottled samples aged at that temperature for 5 hours. The bottles were then removed from the bath and water was added to each in amounts sufficient to completely immerse the polyoxymethylene formed therein. After about 24 hours the water dissolves substantially all of the unpolymerized trioxane remaining in the bottles. The polyoxymethylene was separated from the water by filtering or decanting and the polymer was air dried at about room temperature.

The recovered polyoxymethylenes had reduced viscosities (measured in the manner described hereinabove) ranging from about 0.6 to about 2.4. The thermal stability constant (K(222)) of the polyoxymethylenes was about 1.5, a good result for unstabilized polyoxymethylene polymers. After stabilization with about 1.0% by weight of calcium acetate the stability constants were 0.6 or less.

*Example 2.—Preparation of finely divided polyoxymethylene fibers*

Four polyoxymethylenes were prepared by following the procedures described in Example 1. The polyoxymethylene product was broken up by hand or by other suitable means into particles having a major dimension less than about 1/8 inch. These particles were suspended in a stream of air at a temperature of about 55° Fahrenheit and under a pressure of about 225 pounds per square inch gauge and fed into a commercially available 8-inch fluid energy mill at rates of about 10 grams per minute. Air at room temperature and under a pressure of 200 pounds per square inch gauge was injected into the whirling body of polyoxymethylene to create a turbulent mass in the mill. The finely-divided fibers of polyoxymethylene thus produced were separated from the air stream in a cyclone separator and collected in a drum.

The fibers produced from each of the polyoxymethylene starting materials were examined under a microscope to determine their size and shape. Each batch was found to contain a major proportion (greater than 90%) of fibers having lengths of from about 5 to about 10 microns and diameters less than 1 micron. Minor amounts (less than 10%) of larger fibers or agglomerates of the smaller fibers having major dimensions of up to about 50 microns and minor dimensions of from 5 to 10 microns were also detected in the microscopic examination. Electron micrographs of the fibers showed that the length to diameter ratio of the ultimate fibers was greater than about 10 to 1 in all instances. Apparent density of the fibers, determined by calculation from the tare weight, full weight and size of the collector drum, was approximately .009 gram per milliliter.

The following comparison of reduced specific viscosities of the polyoxymethylene starting materials and the fine sized fibers produced therefrom shows that the high energy grinding had little or no measurable effect on the molecular weight of the polymer.

| Run | Reduced Specified Viscosity [1] | |
| --- | --- | --- |
| | Original Polymer | Fibrous Product |
| 2A | 1.19 | 1.00 |
| 2B | 1.64 | 1.62 |
| 2C | 0.91 | 0.91 |
| 2D | 0.8 | 0.9 |

[1] Determined as described hereinabove.

Other polyoxymethylenes produced by irradiation of trioxane and having reduced specific viscosities as low as about 0.20 have been similarly pulverized to produce finely divided fibers having essentially the same chemical properties as the polymeric starting material.

*Example 3.—Thickening of polyesters with finely divided fibers of irradiation produced polyoxymethylene*

The polyester resin used was a commercially available liquid material having a viscosity of 500 centipoises at 77° Fahrenheit as measured in a Brookfield viscometer using a No. 4 spindle at 6 revolutions per minute. The polyester was admixed with varying proportions of thickening agents and the increase in viscosity was measured in the same viscometer under the same conditions. Agents added were finely divided fibers of irradiation produced polyoxymethylene, two commercially available thickeners, one consisting of millimicron size silica and the other of comminuted solidified vegetable oil derivative, and finally with a fine sized (3 to 4 microns average) silica aerogel. Viscosity of the various thickened samples was also determined in the same apparatus but at 60 revolutions per minute to determine the thixotropic index of the thickened resin (defined as viscosity at 6 r.p.m. divided by viscosity at 60 r.p.m.). Results are shown in Table I.

TABLE I

| Thickener | Thickener Concentration [1] | | | | |
|---|---|---|---|---|---|
| | 0.5 | 1.0 | 2.0 | 3.0 | 4.0 |
| (1) Finely Divided Fibrous Irradiated Polyoxymethylene—Viscosity (centipoises): | | | | | |
| At 6 r.p.m. | 10,000 | 14,000 | 29,000 | 80,000 | |
| At 60 r.p.m. | 2,760 | 4,000 | 7,200 | | |
| Thixotropic Index | 3.6 | 3.7 | 4.1 | | |
| (2) Commercial Thickener A (millimicron silica)—Viscosity (centipoises): | | | | | |
| At 6 r.p.m. | | 2,800 | 9,600 | 15,000 | 33,600 |
| At 60 r.p.m. | | 1,620 | 3,280 | 4,880 | 8,600 |
| Thixotropic Index | | 1.7 | 2.9 | 3.2 | 3.9 |
| (3) Commercial Thickener B (vegetable oil derivative)—Viscosity (centipoises): | | | | | |
| At 6 r.p.m. | 400 | 1,200 | 2,000 | 32,000 | 3,200 |
| At 60 r.p.m. | 640 | 720 | 920 | 1,440 | 1,320 |
| Thixotropic Index | | 1.7 | 2.2 | 2.2 | 2.4 |
| (4) Silica Aerogel—Viscosity (centipoises): | | | | | |
| At 6 r.p.m. | | | | 2,800 | |
| At 60 r.p.m. | | | | 1,720 | |
| Thixotropic Index | | | | 1.6 | |

[1] Parts per 100 parts of polyester.

The data in Table I clearly demonstrates the great superiority in thickening ability of the finely divided fibers of irradiated polyoxymethylene of this invention. In addition, the viscosity increase obtained with the fibrous polyoxymethylene of this invention is retained or decreases with shelf ageing. Any decrease is readily regained by slight agitation of the composition. In comparison, polyester resins thickened with the commercial thickening agents have very poor shelf stability, showing viscosities two to twelve times as great as the original viscosity after only four weeks of shelf storage. Remixing, agitation or pouring afterwards does not assist in stability, and, in fact, results in viscosities only one-half or less of the original viscosity (i.e., viscosity prior to storage). The wettability, dispersibility and dispersion stability of the finely divided fibrous polyoxymethylene is substantially equivalent to that of the commercial thickening agents A and B.

*Example 4.—Thickening of polyepoxides with finely divided fibers of irradiation produced polyoxymethylenes*

The polyepoxide used was a commercially available liquid material having a viscosity of from 500 to 900 centipoises at 78° Fahrenheit, an epoxide equivalent of from 175 to 210 and weighing 9.5 pounds per gallon. The thickening ability of finely divided fibrous irradiation produced polyoxymethylene and of Commercial Thickener A (see Example 3) was compared in the manner described in Example 3. Results are tabulated in Table II.

Again the data demonstrates the greatly superior thickening properties of finely divided fibrous irradiation produced polyoxymethylene. The data also shows that whereas commercial thickener A is effective only when hardener is added to the polyepoxide, the fibrous polyoxymethylene is highly effective with or without hardener.

*Example 5.—Blends of fibrous polyoxymethylene and silica aerogel as thickening agents*

The thickening properties of various blends of the finely divided fibers of irradiated polyoxymethylene with fine sized silica aerogels were determined. Silica aerogels having average particle sizes in the range of from about 2 to about 10 microns are satisfactory. In this specific example the aerogel was a commercially available material having an average particle size of from 3 to 4 microns.

Blends containing various weight percentage, of the fibrous polyoxymethylene of this invention and the above-described aerogel were incorporated at room temperature into the liquid polyester and the liquid polyepoxide described in Examples 3 and 4, respectively. Viscosities of the mixtures were determined after 24 hours, 2 weeks, and 4 weeks, 12 weeks, 26 weeks using a Brookfield viscometer with a number 4 spindle at 6 r.p.m. and 60 r.p.m. In those cases where hardener was added to the polyepoxide it was done at the end of the ageing period. Results are shown in Tables III and IV.

The blends of aerogel and fibrous polyoxymethylene used in this example were prepared by feeding an air stream of said fibers and said aerogel through a fluid

TABLE II

| Thickener | Thickener Concentration [1] | | | | |
|---|---|---|---|---|---|
| | 0.5 | 1.0 | 2.0 | 3.0 | 4.0 |
| (1) Fibrous Polyoxymethylene—Viscosity (centipoises): [2] | | | | | |
| With hardener [3] | 6,400 | 16,800 | (4) | (4) | (4) |
| Without hardener [4] | 11,600 | 36,800 | (4) | (4) | (4) |
| (2) Commercial Thickener A (millimicron silica)—Viscosity (centipoises): [2] | | | | | |
| With hardener [3] | | 2,000 | 12,000 | 37,600 | 100,000 |
| Without hardener | | 1,060 | 2,000 | 1,400 | 47,600 |

[1] Parts per 100 parts of resin.
[2] Brookfield No. 4 Spindle 6 r.p.m.
[3] The hardener used was triethylenetetramine.
[4] Too high to measure (greater than 100,000).

energy mill under the conditions described hereinabove for preparing the fibers. The irradiation produced polyoxymethylene may be pre-comminuted or can be comminuted and blended with the aerogel simultaneously.

Clays:
    Chemically modified _____ (Bentone 34).
    Not modified _____ (Attagel 20).

TABLE III.—THICKENING OF POLYESTER

| Thickener | Concentration (parts per 100 parts of resin) | Remixed after Aging | Properties of Aged Thickened Resin | | | | | |
|---|---|---|---|---|---|---|---|---|
| | | | Aged One Hour | | | Aged 24 Hours | | |
| | | | Viscosity [1] (centipoises) | Thixotropic Index [2] | Pot Life Min.[3] | Viscosity [1] (centipoises) | Thixotropic Index [2] | Pot Life Min.[3] |
| IPOM [4] | 0.5 | No | 8,800 | 3.4 | 54 | 8,000 | 3.2 | ---- |
| | | Yes | ---- | ---- | ---- | 7,600 | 3.0 | 59 |
| 80% IPOM, 20% Silica Aerogel | 0.5 | No | ---- | ---- | ---- | 9,200 | 3.0 | ---- |
| | | Yes | 10,000 | 3.3 | 47 | 9,200 | 3.1 | 65 |
| 60% IPOM, 40% Silica Aerogel | 0.75 | No | ---- | ---- | ---- | 11,200 | 3.1 | ---- |
| | | Yes | 10,000 | 3.2 | 56 | 10,000 | 2.9 | 60 |
| 25% IPOM, 75% Silica Aerogel | 0.75 | No | ---- | ---- | ---- | 8,000 | 3.2 | ---- |
| | | Yes | 7,200 | 3.2 | 61 | 7,200 | 3.0 | 72 |

| Thickener | Concentration (parts per 100 parts of resin) | Remixed after Aging | Properties of Aged Thickened Resin | | | | | |
|---|---|---|---|---|---|---|---|---|
| | | | Aged 2 Weeks | | | Aged 4 Weeks | | |
| | | | Viscosity [1] (centipoises) | Thixotropic Index [2] | Pot Life Min.[3] | Viscosity [1] (centipoises) | Thixotropic Index [2] | Pot Life Min.[3] |
| IPOM [4] | 0.5 | No | 4,000 | 2.0 | ---- | 5,690 | 1.9 | ---- |
| | | Yes | 7,600 | 3.0 | 54 | 7,600 | 3.3 | ---- |
| 80% IPOM, 20% Silica Aerogel | 0.5 | No | 4,800 | 2.0 | ---- | 13,600 | 2.9 | ---- |
| | | Yes | 9,200 | 3.3 | 64 | 10,000 | 3.3 | 54 |
| 60% IPOM, 40% Silica Aerogel | 0.75 | No | 12,000 | 3.0 | ---- | 10,000 | 2.5 | ---- |
| | | Yes | 12,800 | 3.6 | 67 | 10,000 | 2.9 | 69 |
| 25% IPOM, 75% Silica Aerogel | 0.75 | No | 8,000 | 3.3 | ---- | 7,600 | 2.3 | ---- |
| | | Yes | 6,800 | 2.4 | 72 | 8,400 | 3.2 | 69 |

| Thickener | Concentration (parts per 100 parts of resin) | Remixed after Aging | Properties of Aged Thickened Resin | | | | | |
|---|---|---|---|---|---|---|---|---|
| | | | Aged 12 Weeks | | | Aged 26 Weeks | | |
| | | | Viscosity [1] (centipoises) | Thixotropic Index [2] | Pot Life Min.[3] | Viscosity [1] (centipoises) | Thixotropic Index [2] | Pot Life Min.[3] |
| IPOM [4] | 0.5 | No | ---- | ---- | ---- | ---- | ---- | ---- |
| | | Yes | 10,600 | 3.4 | 90 | 11,800 | 2.8 | 223 |
| 80% IPOM, 20% Silica Aerogel | 0.5 | No | ---- | ---- | ---- | ---- | ---- | ---- |
| | | Yes | 8,800 | 2.8 | 84 | 12,600 | 3.1 | 212 |
| 60% IPOM, 40% Silica Aerogel | 0.75 | No | ---- | ---- | ---- | ---- | ---- | ---- |
| | | Yes | 13,600 | 3.2 | 93 | 15,200 | 3.2 | 177 |
| 25% IPOM, 75% Silica Aerogel | 0.75 | No | ---- | ---- | ---- | ---- | ---- | ---- |
| | | Yes | 9,600 | 3.3 | 74 | 8,400 | 2.8 | 113 |

[1] At 6 r.p.m.
[2] Ratio—Viscosity at 6 r.p.m. divided by viscosity at 60 r.p.m. Brookfield No. 4 Spindle.
[3] Workable life of resin after catalyst added.
[4] IPOM=finely divided fibers of irradiation produced polyoxymethylene.

*Example 6.—Blends of fibrous polyoxymethylene and fine sized materials as thickening agents*

The thickening properties of finely divided fibers of irradiated produced polyoxymethylene blended with other fine sized materials were determined. The fine sized (about 5 to 50 microns) materials were:

Silicas:
    Precipitated _____ (Hi Sil 233).
    Flame produced _____ (Cab-o-Sil M–5).
    Fumed _____ (Sheer-Korman 35 S).
    Aerogel _____ (Santocel 54, Syloid 244).
    Naturally occurring ____ (Mikro-Perl #3).

Minerals:
    Asbestos 7T.
    Mica 1K.
    Talc 6J.
    Diatomaceous earth _____ (Celite 165 S).

Finely divided polymers:
    Polyvinylchloride _____ (Opalon 3 FM).
    Polyethylene _____ (Grex 50–050C).
    Nylon 6 _____ (Zytel 211).
    Oxidized polyethylene.

The blends of fibrous polyoxymethylene and the fine sized materials described above were prepared by feeding an air stream of said fibers and said fine sized material through a fluid energy mill under the conditions described hereinabove for the preparation of the fibers. The irradiated polyethylene may be pre-comminuted or can be comminuted and blended with the fine-sized materials simultaneously. The blended polyoxymethylene and fine sized materials were incorporated at room temperature into the liquid polyester described in Example 3. Viscosities of the mixtures were determined after 24 hours using a Brookfield viscometer with a number 4 spindle at 6 revolutions per minute and 60 revolutions per minute. In those cases where the catalyst was added to the polyester it was done at the end of the aging period.

The results are shown in Table IV:

TABLE IV.—THICKENING OF POLYESTER

| Thickener | | Performance | | | | |
|---|---|---|---|---|---|---|
| Identity | Concentration in phr.[1] | Dispersion of Thickener | Suspension after 24 Hours | Viscosity, cps. at 6 r.p.m.[2] | Thixotropic Index [3] | Pot Life Min.[4] |
| Hi Sil 233 | 3 | Good | Settled out | 800 | 1.3 | |
| 75% Hi Sil 233-25% POM | 1 | do | Good | 6,800 | 3.0 | 42 |
| Cab-O-Sil M-5 | 3 | do | do | 13,600 | 3.9 | |
| 75% Cab-O-Sil M-5-25% POM | 1 | do | do | 6,400 | 3.1 | 39 |
| Sheer-Korman 35-S | 3 | do | Settled out | 800 | 1.3 | |
| 90% Sheer-Korman 35-S-10% POM | 1 | do | Good | 4,000 | 2.6 | 33 |
| Santocel 54 | 3 | do | do | 1,600 | 2.0 | |
| 75% Santocel 54-25% POM | 1 | do | do | 6,000 | 2.8 | 34 |
| Syloid 244 | 3 | do | do | 1,400 | 1.8 | |
| 75% Syloid 244-25% POM | 1 | do | do | 5,600 | 3.0 | 44 |
| Mikro-Perl #3 | 3 | do | do | 600 | 1.3 | |
| 80% Mikro-Perl #3-20% POM | 1 | do | do | 1,200 | 1.6 | 38 |
| Bentone 34 | 3 | do | Settled out | 1,400 | 1.6 | |
| 80% Bentone 34-20% POM | 1 | do | Good | 4,000 | 2.7 | 36 |
| Attagel 20 | 3 | do | Settled out | 600 | 1.4 | |
| 80% Attagel 20-20% POM | 1 | do | Good | 2,000 | 2.1 | 53 |
| Asbestos 7T | 3 | do | do | 4,800 | 2.1 | |
| 80% Asbestos 7T-20% POM | 1 | do | do | 5,600 | 2.9 | 61 |
| Mica 1K | 3 | do | Settled out | 600 | 1.4 | |
| 80% Mica 1K-20% POM | 1 | do | Good | 2,800 | 1.8 | 33 |
| Talc 6J | 3 | do | Settled out | 600 | 1.3 | |
| 80% Talc 6J-20% POM | 1 | do | Good | 1,000 | 1.4 | 42 |
| Celite 165S | 3 | do | Settled out | 800 | 1.5 | |
| 80% Celite 165S-20% POM | 1 | do | Good | 1,800 | 2.1 | 42 |
| Polyvinyl Chloride (Opalon 3FM) | 3 | do | do | 800 | | |
| 75% Polyvinyl Chloride-25% POM | 1 | do | do | 3,600 | 2.4 | 40 |
| Polyethylene (Grex 50-050C) | 3 | | | 4,800 | 2.3 | |
| 75% Polyethylene-25% POM | 1 | Good | Good | 3,400 | 2.3 | 35 |
| Nylon 6 (Zytel 211) | 3 | | | 2,200 | 1.6 | |
| 75% Nylon 6-25% POM | 1 | Good | Good | 2,800 | 2.1 | 34 |
| Oxidized Polyethylene | 3 | | | 3,200 | 1.9 | |
| 75% Oxidized Polyethylene-25% POM | 1 | Good | Good | 3,200 | 2.1 | 39 |
| Controls: | | | | | | |
| No thickener | 0 | | | 600 | | 41 |
| POM | 1 | | | 23,000 | 2.9 | 36 |
| POM | 0.25 | | | 3,100 | 1.8 | |
| Silica (Flame Produced) | 1 | | | 2,200 | 2.0 | 36 |

[1] Phr.=parts of thickener by weight per 100 parts of resin (polyester) by weight.
[2] Brookfield viscosity, No. 4 Spindle.
[3] Thixotropic Index=viscosity at 6 r.p.m. divided by viscosity at 60 r.p.m.
[4] Workable life of resin after catalyst added.

The following example illustrates the various methods of preparing blends of finely divided fibers of irradiated polyoxymethylene and other fine-sized materials (e.g. silica aerogel). The preferred method of blending irradiated polyoxymethylene and a silica aerogel is through the use of the fluid energy mill as described in Example 2.

*Example 7.—Comparison of methods of blending IPOM and fine-sized material to give optimum thickening*

Blends of finely divided fibers of irradiated polyoxymethylene and a commercially available silica aerogel having an average particle size of from 3 to 4 microns were prepared (as described below) for use as thickening agents in liquid organic materials. The liquid organic used as a test material was a commercially available polyester resin having a viscosity of 600 centipoises at 77° F. as measured in a Brookfield viscometer using a No. 4 spindle at 6 revolutions per minute. The polyester was admixed with a predetermined amount of thickening preparations and the increase in viscosity was measured in the same viscometer and under the same conditions. The thickening compositions were prepared as follows:

*Preparation #1.*—A blend of fibrous polyoxymethylene and silica aerogel was prepared by feeding an air stream of 20 parts by weight said fibers and 80 parts by weight said aerogel through a fluid energy mill under the conditions described hereinabove for preparing the fibers.

*Preparation #2.*—5 gms. of finely divided fibers of irradiated polyoxymethylene and 15 gms. of fine-sized silica aerogel were placed in a wide mouth half-gallon container. The contents of the container were blended by stirring with a laboratory stirrer for five minutes.

*Preparation #3.*—10 gms. of the composition prepared by the method of Test #2 was milled by passing the composition through a Micro-Pulverizer hammer mill equipped with a 2.020 in. herringbone screen.

*Preparation #4.*—In this test the finely divided fibers of irradiated polyoxymethylene and the fine-sized silica aerogel were not pre-blended, but were added separately to the test resin. The ratio of addition of silica aerogel to polyoxymethylene was 8 to 2.

The viscosities are shown in Table V.

On visual examination it was observed that the composition prepared with the fluid energy mill was homogeneous. The compositions prepared by the other methods described above on visual inspection were not homogeneous and unattached silica aerogel was noticeably present throughout these compositions.

TABLE V

| Test No. | Thickener | Concentration (parts per 100 parts of resin) | Viscosity in Centipoises of Polymer Resin at— | |
|---|---|---|---|---|
| | | | 6 r.p.m. | 60 r.p.m. |
| 1 | 25% IPOM, 75% Silica Aerogel | 3 | 42,000 | [1] 19,000 |
| 2 | do | 3 | 21,800 | 6,200 |
| 3 | do | 3 | 18,800 | 5,460 |
| 4 | 20% IPOM, 80% Silica Aerogel | 3 | 20,000 | 5,680 |

[1] At 30 r.p.m.

Blends of the irradiated polyoxymethylene and fine sized materials described above are advantageous commercially. The addition of the said fine sized materials to the irradiated polyoxymethylene greatly facilitates the dispersion of the irradiated polyoxymethylene while not appreciably affecting its thickening qualities. Also in those applications where use of an organic thickener is required, fine sized particulate polymers can be blended with irradiated polyoxymethylene as described above.

*Example 8.—Insecticidal compositions*

*Preparation #1.*—71.2 gms. per minute of fine sized fluoridated silica aerogel (e.g., Dri-Die 67) and 3.8 gms. per minute of irradiated polyoxymethylene were suspended simultaneously in an air stream at room temperature and under a pressure of about 180 pounds per square inch gauge and fed into a commercially available fluid energy mill. Air at room temperature and under a pressure of 200 pounds per square inch gauge was injected into the whirling body of polyoxymethylene and fluoridated silica aerogel particles to create a turbulent mass in the mill. The composition of finely divided fibrous polyoxymethylene and fluoridated silica aerogel was separated from the air stream in a cyclone separator and collected in a suitable container.

*Preparation #2.*—71.2 gms. per minute of a fine sized silica aerogel (e.g., Syloid 244) and 3.8 gms. per minute of irradiated polyoxymethylene were suspended simultaneously in an air stream and fed into a fluid energy mill under the condition described in Preparation #1.

*Preparation #3.*—Fine sized fibers of irradiated polyoxymethylene were prepared as described in Example 2.

The insecticidal properties of each of the above preparations was determined as follows. The inside bottom of a flat pan was lined with a sheet of paper. Thirty milligrams of the composition to be tested was dusted over the paper sheet lining the bottom. Six adult male German roaches were placed in the pan and examined every fifteen minutes to determine if they were unaffected, knockdown or dead. The results are described in Table VI.

TABLE VI

|  | Knockdown Time | | Kill Time | |
|---|---|---|---|---|
|  | 50% | 100% | 50% | 100% |
| Preparation #1 | 1.5 | 2.0 | 2.0 | 2.4 |
| Preparation #2 | 1.5 | 2.0 | 2.4 | 2.5 |
| Preparation #3 | >7.0 | | >7.0 | 7.0–<22.0 |
| Fluoridated Silica Aerogel | 1.6 | 2.9 | 2.6 | 3.6 |
| Silica Aerogel | 2.0 | 6.25 | 2.75 | 6.25 |

Two new and unobvious results arose from this insecticidal testing. The first was the upgrading of the insecticidal properties of the silica aerogel (Preparation #2). The aerogel alone was a poor performer in comparison with the fluoridated silica aerogel (Dri-Die 67), but when blended with polyoxymethylene it equaled the insecticidal properties of Dri-Die 67. The second unobvious result was an increase in the adhesion qualities of the two aerogels (Dri-Die 67 and Syloid 244) to the insect. The fibrous nature of the polyoxymethylene and the aerogel causes it to become entangled on the insect. The insects could not preen themselves when the polyoxymethylene was in the insecticidal dust. The polyoxymethylene also created "dustless" forms of the insecticidal dusts. The insecticides can now be handled easily without creating annoying dust clouds. They can now be spread about and be dispersed from dusters without creating clouds of very fine dust, the dust is now for the most part in the form of soft flocculant-like agglomerates.

What is claimed is:

1. Thixotropically thickened composition comprising a resinous organic liquid having incorporated therein a small amount of fibers of irradiation produced polyoxymethylene, said fibers having a major dimension less than about 50 microns and a length to diameter ratio greater than about 10 to 1.

2. Composition as defined in claim 1 wherein said fibers have a major dimension less than about 10 microns.

3. Composition as defined in claim 2 wherein said resinous organic liquid is a liquid polyester and said fibers are incorporated in amounts ranging from about 0.1 to about 5.0 parts per 100 parts, by weight, of said polyester.

4. Composition as defined in claim 2 wherein said resinous organic liquid is a liquid polyepoxide and said fibers are incorporated in amounts ranging from about 0.1 to about 5.0 parts per 100 parts, by weight, of said polyepoxide.

5. Thixotropically thickened composition comprising a resinous organic liquid having incorporated therein a small amount of a thickening agent comprising a blend of about 5 percent to about 95 percent by weight of a silica aerogel having an average particle size of from about 2 to about 10 microns and from about 95 to 5 percent by weight of fibers of irradiation produced polyoxymethylene, said fibers having a major dimension less than about 50 microns and a length to diameter ratio greater than about 10 to 1.

6. Composition as defined in claim 5 wherein said aerogel has an average particle size of about 3 to 4 microns and said fibers have a major dimension less than about 10 microns, and wherein said blend is comprised of 25 to 80 percent of said aerogel and 75 to 20 percent of said fibers.

7. Composition as defined in claim 6 wherein said resinous organic liquid is a liquid polyester and said thickening agent is incorporated in amounts of ranging from about 0.1 to about 5.0 parts per 100 parts, by weight, of said polyester.

8. Composition as defined in claim 6 wherein said resinous organic liquid is a liquid polyepoxide and said thickening agent is incorporated in amounts of ranging from about 0.1 to about 5.0 parts per 100 parts, by weight, of said polyepoxide.

9. Composition for thixotropically thickening liquid resinous organic materials comprising a blend of from about 5 percent to about 95 percent by weight of silica aerogel having an average particle size of from about 2 to about 10 microns, with from about 95 percent to about 5 percent by weight of fibers of irradiation produced polyoxymethylene, said fibers having a major dimension less than about 50 microns and a length to diameter ratio greater than about 10 to 1.

10. Composition as defined in claim 9 wherein said aerogel has an average particle size of about 3 to 4 microns and said fibers have a major dimension less than about 10 microns, and wherein said blend is comprised of 25 to 80 percent of said aerogel and 75 to 20 percent of said fibers.

11. Method for thixotropically thickening liquid resinous organic materials comprising incorporation therein a small amount of fibers of irradiation produced polyoxymethylene, said fibers having a major dimension less than about 50 microns and a length to diameter ratio greater than about 10 to 1.

12. Process as defined in claim 11 wherein said fibers have a major dimension less than about 10 microns.

13. Process for thixotropically thickening liquid polyesters which comprises incorporating therein from about 0.1 to about 5.0 parts per 100 parts, by weight, of said polyester, of fibers of irradiation produced polyoxymethylene, said fibers having a major dimension less than about 10 microns and a length to diameter ratio of greater than 10 to 1.

14. Process for thixotropically thickening liquid polyepoxides which comprises incorporating therein from about 0.1 to about 5.0 parts per 100 parts, by weight, of said polyepoxide, of fibers of irradiation produced polyoxymethylene, said fibers having a major dimension less than about 10 microns and a length to diameter ratio of greater than about 10 to 1.

15. Process for thixotropically thickening liquid resinous organic materials comprising incorporating therein a small amount of a blend comprising of from about 5 percent to about 95 percent by weight of silica aerogel having an average particle size of from about 2 to 10 microns, with from about 95 percent to about 5 percent by weight of fibers of irradiation produced polyoxymethylene, said fibers having a major dimension less than about 50 microns and a length to diameter ratio greater than about 10 to 1.

16. Process for thixotropically thickening liquid resinous organic materials comprising incorporating therein from about 0.1 to about 5.0 parts per 100 parts, by weight, of said material of a blend comprising from about 20 percent to about 75 percent, by weight, of silica aerogel having an average particle size of from about 3 to about 4 microns with from about 80 percent to about 25 percent, by weight, of fibers of irradiation produced polyoxymethylene, said fibers having a major dimension less than about 10 microns and a length to diameter ratio greater than about 10 to 1.

17. Process as defined in claim 16 wherein said liquid resinous organic material is a liquid polyester.

18. Process as defined in claim 16 wherein said liquid resinous organic material is a liquid polyepoxide.

19. Process for preparing a stable thixotropic thickening agent comprising blending from about 5 to about 95 weight percent of silica aerogel having an average particle size between about 2 and about 10 microns with from about 95 to 5 weight percent of comminuted fibers of irradiation produced polyoxymethylene, said fibers having a major dimension less than about 10 microns and a length to diameter ratio greater than about 10 to 1; said blending step being performed in a fluid energy mill.

20. Process as defined in claim 19 wherein said fibers are comminuted and simultaneously blended with said aerogel.

21. Thixotropically thickened composition comprising a resinous organic liquid having incorporated therein a small amount of a thickening agent comprising a blend of about 5 percent to 95 percent by weight of a fine sized particulate chemically inert material having a particle size of from about 10 millimicrons to about 50 microns, and from about 95 to 5 percent by weight of fibers of irradiation produced polyoxymethylene, said fibers having a major dimension less than about 50 microns and a length to diameter ratio greater than about 10 to 1.

22. A composition as defined in claim 21 wherein said resinous organic liquid is a liquid polyester and said thickening agent is incorporated in amounts ranging from about 0.1 to about 5.0 parts per 100 parts, by weight, of said polyester.

23. Composition as defined in claim 21 wherein said resinous organic liquid is a liquid polyepoxide and said thickening agent is incorporated in amounts ranging from about 0.1 to about 5.0 parts per 100 parts, by weight, of said polyepoxide.

24. Composition as defined in claim 21 wherein said fine sized particulate chemically inert material is silica.

25. Composition as defined in claim 21 wherein said fine sized particulate chemically inert material is clay.

26. Composition as defined in claim 21 wherein said fine sized particulate chemically inert material is chemically modified clay.

27. Composition as defined in claim 21 wherein said fine sized particulate chemically inert material is asbestos.

28. Composition as defined in claim 21 wherein said fine sized particulate chemically inert material is mica.

29. Composition as defined in claim 21 wherein said fine sized particulate chemically inert material is talc.

30. Composition as defined in claim 21 wherein said fine sized particulate chemically inert material is diatomaceous earth.

31. Composition as defined in claim 21 wherein said fine sized particulate chemically inert material is polyvinylchloride.

32. Composition as defined in claim 21 wherein said fine sized particulate chemically inert material is polyethylene.

33. Composition as defined in claim 21 wherein said fine sized particulate chemically inert material is nylon.

34. Composition as defined in claim 21 wherein said fine sized particulate chemically inert material is oxidized polyethylene.

35. Process for preparing a stable thixotropic thickening agent comprising blending from about 5 to about 95 weight percent of fine sized particulate chemically inert material having a particle size of from about 10 millimicrons to about 50 microns and from about 95 to 5 weight percent of comminuted fibers of irradiation produced polyoxymethylene, said fibers having a major dimension less than about 10 microns and a length to diameter ratio greater than about 10 to 1; said blending step being performed in a fluid energy mill.

36. Process as defined in claim 6 wherein said fibers are comminuted and simultaneously blended with said fine sized material.

References Cited by the Examiner

UNITED STATES PATENTS

| | | | |
|---|---|---|---|
| 2,715,763 | 8/1955 | Marley | 161—181 |
| 2,795,290 | 6/1957 | Butsch et al. | 264—8 XR |
| 2,862,242 | 12/1958 | Jones | 264—12 |
| 2,897,114 | 7/1959 | Sauls | 167—42 |
| 2,915,475 | 12/1959 | Bugosh | 260—40 |
| 2,923,659 | 2/1960 | Ziegler et al. | 167—42 |
| 2,962,467 | 11/1960 | Wagner | 260—37 |
| 3,009,205 | 11/1961 | Monson et al. | 264—12 |
| 3,048,537 | 8/1962 | Pall et al. | 264—126 XR |
| 3,057,040 | 10/1962 | Cuculo | 161—181 |
| 3,077,424 | 2/1963 | Maker et al. | 260—40 |
| 3,086,954 | 4/1963 | Polmanteer et al. | 260—37 |
| 3,093,560 | 6/1963 | Fourcade | 260—67 |
| 3,131,148 | 4/1964 | Talulli | 260—40 |
| 3,168,495 | 2/1965 | Hopff et al. | 260—67 |
| 3,194,762 | 7/1965 | Browning et al. | 252—52 |

MORRIS LIEBMAN, *Primary Examiner.*

ALEXANDER H. BRODMERKEL, ALAN LIEBERMAN, *Examiners.*

P. E. ANDERSON, J. E. CALLAGHAN,
*Assistant Examiners.*